US012695277B2

(12) United States Patent
Xu et al.

(10) Patent No.: US 12,695,277 B2
(45) Date of Patent: Jul. 28, 2026

(54) SWITCHGEAR

(71) Applicant: ABB Schweiz AG, Baden (CH)

(72) Inventors: Liming Xu, Xiamen (CN); Shailendra Singh, Skien (NO); Siyuan Huang, Xiamen (CN); Xingjie Chen, Xiamen (CN); Liqun Huang, Xiamen (CN); Dukkaiappan Subbiah Thevar, Nordrhein-Westfalen (DE)

(73) Assignee: ABB SCHWEIZ AG, Baden (CH)

( * ) Notice: Subject to any disclaimer, the term of this patent is extended or adjusted under 35 U.S.C. 154(b) by 303 days.

(21) Appl. No.: 18/557,440

(22) PCT Filed: May 18, 2021

(86) PCT No.: PCT/CN2021/094457
    § 371 (c)(1),
    (2) Date: Oct. 26, 2023

(87) PCT Pub. No.: WO2022/241656
    PCT Pub. Date: Nov. 24, 2022

(65) Prior Publication Data
    US 2024/0429689 A1      Dec. 26, 2024

(51) Int. Cl.
    H02B 13/025        (2006.01)
    H02B 13/035        (2006.01)
(52) U.S. Cl.
    CPC ....... H02B 13/0358 (2013.01); H02B 13/025 (2013.01)
(58) Field of Classification Search
    CPC .......................... H02B 13/0358; H02B 13/025
    USPC ........................................................ 361/618
    See application file for complete search history.

(56) References Cited

U.S. PATENT DOCUMENTS

| | | | | |
|---|---|---|---|---|
| 6,504,103 B1 * | 1/2003 | Meyer ................... | H01R 13/53 | 439/680 |
| 6,510,046 B2 * | 1/2003 | Arioka ................. | H02B 13/035 | 218/120 |
| 7,158,369 B2 * | 1/2007 | Lammers ............... | H01H 33/22 | 361/612 |
| 7,417,846 B2 * | 8/2008 | Arioka ................. | H02B 13/035 | 361/612 |

(Continued)

FOREIGN PATENT DOCUMENTS

| | | |
|---|---|---|
| CN | 105305285 A | 2/2016 |
| CN | 206389056 U | 8/2017 |

(Continued)

OTHER PUBLICATIONS

Siemens, Installation and Operating Instructions—Medium-Voltage Switchgear, Fixed-mounted circuit-breaker switchgear type NXPLUS C up to 38kV, Extendable Single busbar, metal-enclosed, gas-insulated; Revision 2, Issued Nov. 2, 2018; 266 pages.

*Primary Examiner* — Anatoly Vortman
(74) *Attorney, Agent, or Firm* — Greenberg Traurig, LLP

(57)             ABSTRACT

A switchgear which includes a cable compartment enclosed by walls and a cover, and a cable connector arranged in the cable compartment. The cable connector is configured to electrically connect a cable to a cable bushing located in the cable compartment. cable connector includes a first portion to which the cable is connected and a metal plate arranged inside the cable compartment. The shortest distance between a main body and an outer surface of the first portion is in the range of 0 to 10 mm.

15 Claims, 4 Drawing Sheets

(56)        References Cited

U.S. PATENT DOCUMENTS

| | | | |
|---|---|---|---|
| 11,901,709 B2 * | 2/2024 | Fukuoka .............. | H02B 13/045 |
| 2002/0012226 A1 * | 1/2002 | Arioka ................ | H02B 13/035 |
| | | | 361/618 |
| 2011/0299228 A1 * | 12/2011 | Milovac ................ | H02B 11/26 |
| | | | 29/825 |
| 2018/0090914 A1 * | 3/2018 | Johnson ................... | H02B 1/30 |
| 2019/0260190 A1 * | 8/2019 | Ma ....................... | H02B 13/025 |
| 2019/0287718 A1 | 9/2019 | Ranedo Torres et al. | |

FOREIGN PATENT DOCUMENTS

| | | | |
|---|---|---|---|
| EP | 2273634 A1 | 1/2011 | |
| EP | 3671993 A1 | 6/2020 | |
| WO | 2004040728 A1 | 5/2004 | |
| WO | 2019183964 A1 | 10/2019 | |

* cited by examiner

SWITCHGEAR

CROSS-REFERENCE TO RELATED APPLICATIONS

This is a national stage application claiming priority to international patent application Serial No.: PCT/CN2021/094457, filed on May 18, 2021; which is herein incorporated by reference in its entirety.

FIELD

Embodiments of the present disclosure generally relate to the field of electrical power distribution equipment, and more particularly, relate to a switchgear.

BACKGROUND

Arc resistant switchgear is electrical equipment designed to withstand the effects of an internal arc fault. The arc itself can be caused by many reasons, such as bad insulation in the switchgear, an aging of electrical devices in the switchgear, a thunderstrike, a non-standard operation of the switchgear, and abnormal connections between cables in the switchgear. As an arc occurs in the switchgear, gases inside the switchgear are ionized. The ionization of the gases reduces the ability of the gases inside the switchgear to provide its previous insulating capabilities. The occurrence of the arc fault inside the switchgear has many undesirable results. When the arc occurs, the combination of the rapid build-up in heat and the rapid build-up in pressure may result in an explosion and the energy of the arc also causes severe mechanical and thermal stresses on the equipment.

Attempts have focused on reducing the chance of arc occurrence or reducing the impedance of the arc. In the disclosure of document EP3671993A1, an electrical arc absorber system for a switchgear is described. The arc absorber system includes an impedance reduction system (110) for reducing the impedance of an electrical arc appearing in the switchgear between the current phases or the current phases and the ground. The impedance reduction system reduces the impedance for the electrical arc compared to the impedance of the electrical arc in the medium present in the switchgear. Further, the impedance reduction system (110) comprising at least one arc catcher (111; 112; 113) for the current phases of the current. Also, a switchgear including an arc absorber system and a method for operating a switchgear is described.

However, the traditional switchgear is unable to reduce the energy of the arc efficiently so as to protect the individuals around the switchgear. Particularly, it is practical to reduce the cost of the switchgear, for example, by reducing the thickness of a cover of the switchgear. Regarding the switchgear with a cover having a thickness equal to or less than 3 mm, the energy of the arc will destroy the cover, which is dangerous to individuals nearby the switchgear. Accordingly, there is a need for an improved switchgear that can reduce the energy of the arc as much as possible to minimize the undesirable results.

SUMMARY

In view of the foregoing problems, example embodiments of the present disclosure propose an improved switchgear that can reduce the chance of arc occurrence and/or reduce the energy of the arc to minimize the undesirable results.

In an aspect of the present disclosure, a switchgear is provided. The switchgear comprises: a cable compartment enclosed by walls and a cover; a cable connector arranged in the cable compartment and configured to electrically connect a cable to a cable bushing located in the cable compartment, wherein the cable connector comprises a first portion to which the cable is connected; and a metal plate arranged inside the cable compartment and comprising a main body arranged around the first portion; wherein a shortest distance between the main body and an outer surface of the first portion is in the range of 0 to 10 mm.

With these embodiments, when an arc occurs in the cable compartment, the metal plate can be ionized by the heat of the arc to produce metal particles. The produced metal particles will be incorporated into the plasma generated by the ionization of the gases and thus can increase the electrical conductivity of the plasma, thereby reducing the electrical resistance of the plasma. This helps to reduce a voltage drop across the plasma, and thus reduce the energy of the arc. In this way, it is possible to minimize the undesirable results caused by the arc.

Further, thanks to the ionization of the metal plate, a part of the energy of the arc is consumed and thus the temperature of the arc or the gases can be reduced. This is beneficial to reduce the pressure and the temperature inside the cable compartment.

The main body of the metal plate arranged adjacent to the first portion will be ionized by the arc easily if the arc occurs. In this way, the energy of the arc can be reduced immediately if the arc occurs.

In some embodiments, at least a part of the main body contacts the outer surface of the first portion. As the main body contacts the outer surface of the first portion, the metal plate can be ionized immediately to increase the electrical conductivity of the plasma if the arc occurs. Alternatively, or in addition, the main body helps to connect an outer surface of the cable connector to ground.

In some embodiments, the metal plate further comprises a bending portion extending from the main body towards the cable; wherein the first portion comprises an end for connecting the cable; and wherein a shortest distance between the bending portion and the end of the first portion is in the range of 0 to 10 mm. With these embodiments, the gases and the energy of the arc can be guided to the venting channel arranged at the rear of the switchgear to reduce damage to the cover. Further, the bending portion can be ionized immediately if the arc occurs at a position where the cable is connected to the first portion.

In some embodiments, the bending portion comprises a notch accommodating the cable.

In some embodiments, the cable connector further comprises a second portion extending perpendicular to the first portion and having a first end connected to the cable bushing and a second end opposite to the first end; and wherein the metal plate further comprises a support portion supporting the second portion at a position near the second end.

The cable bushing is connected to a circuit breaker compartment hermetically, while the cable connector and the cable bushing connected with each other actually constitute a structure of a cantilever beam. By supporting one end of the cable connector via the metal plate, the weight of the cable connector and the cable bushing can be partially carried by the metal plate. Thus, it is possible to prevent a leakage at a connecting position between the cable bushing and the circuit breaker compartment.

In addition, with these embodiments, insulation defects are unlikely to happen at the connecting position between the cable connector and the cable bushing, compared to the case that the cable connector is not supported. This is beneficial to improve the reliability of the connecting position, thereby reducing the chance of arc occurrence. Alternatively, or in addition, the supporting portion helps to connect the outer surface of the cable connector to ground.

In some embodiments, the main body extends vertically and is positioned between the first portion and the cover.

In some embodiments, two or more cable connectors are connected to the cable bushing in series; and wherein two or more metal plates are arranged and the main body of each metal plate is arranged around the corresponding first portion.

In some embodiments, a first end of the main body is fixed to a roof wall of the walls.

In some embodiments, three cable connectors are respectively connected to a respective cable of three-phase cables; and wherein the metal plates for the three-phase cables are formed as an integrated plate.

In some embodiments, the switchgear further comprising a bus compartment located above the cable compartment, the bus compartment comprising: a bus bar and a busbar bushing; a bus connector connecting the bus bar to the busbar bushing, the bus connector having an end to which the bus bar is connected; a further metal plate arranged inside the bus compartment and positioned around the bus connector; wherein a shortest distance between the further metal plate and an outer surface of the end of the bus connector is in the range of 0 to 10 mm.

In some embodiments, the further metal plate is configured to support a potential transformer and comprises a hole through which the potential transformer is connected to the bus connector.

In some embodiments, the switchgear further comprising: a circuit breaker compartment located between the bus compartment and the cable compartment; and a venting channel for venting gases out of the switchgear upon occurrence of an arc fault in the cable compartment or the bus compartment.

In some embodiments, the thickness of the cover is in the range of 0 to 3 mm.

In some embodiments, the cover is made of a single-layer metal plate.

In some embodiments, the first portion further comprises a protrusion for connecting an outer layer of the cable connector to ground; and wherein the metal plate further comprises an opening for receiving the protrusion of the first portion.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an exemplary and in a non-limiting manner, wherein.

4

Figure 4:
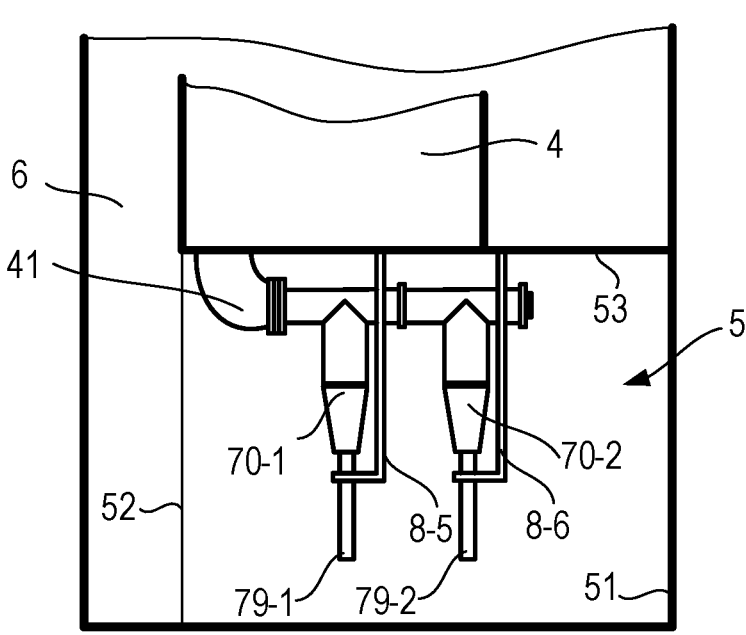
Figure 5:
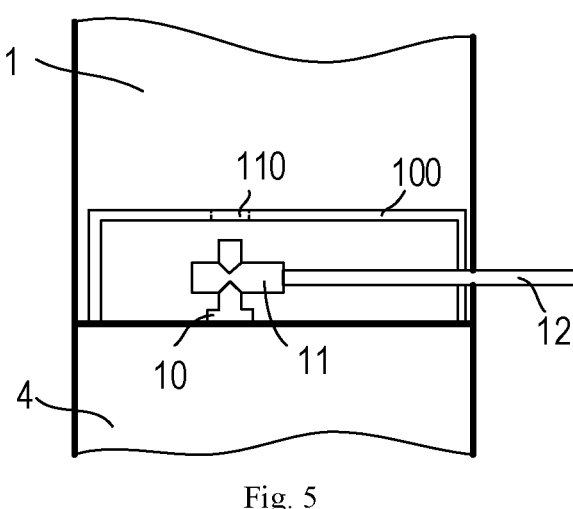

FIG. 4 schematically illustrates a further exemplary arrangement of the metal plate relative to the cable connectors according to an embodiment of the present disclosure; and FIG. 5 schematically illustrates a bus compartment of the switchgear according to an embodiment of the present disclosure.

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As described above, the occurrence of the arc fault inside the switchgear has many undesirable results, and the walls or covers of the switchgear are required to have high strength. Accordingly, there is a need for a cost-effective switchgear that can minimize the undesirable results.

According to embodiments of the present application, a design is proposed based on a concept of reducing the energy of the arc according to the characteristic of the arc. The proposed solution can significantly improve the reliability and security of the switchgear.

The principle of reducing the energy of the arc will be explained in detail below. As an arc occurs due to some reasons, the gases inside the switchgear are ionized to produce air plasma. This ionization of the gases reduces the insulating ability of the gases inside the switchgear. Since the electrical conductivity of the air plasma is relative low, a great voltage drop is generated across the air plasma. This leads to a rapid built-up in heat and in pressure, and leads to a possible explosion.

If a metal plate is positioned near the arc to increase an electrical conductivity of the plasma, the electrical resistance of the arc can be decreased and the voltage drop across the plasma can be decreased as well. This helps to reduce the energy of the arc, thereby reducing the heating of the air and the pressure level in the switchgear.

Figure 1:
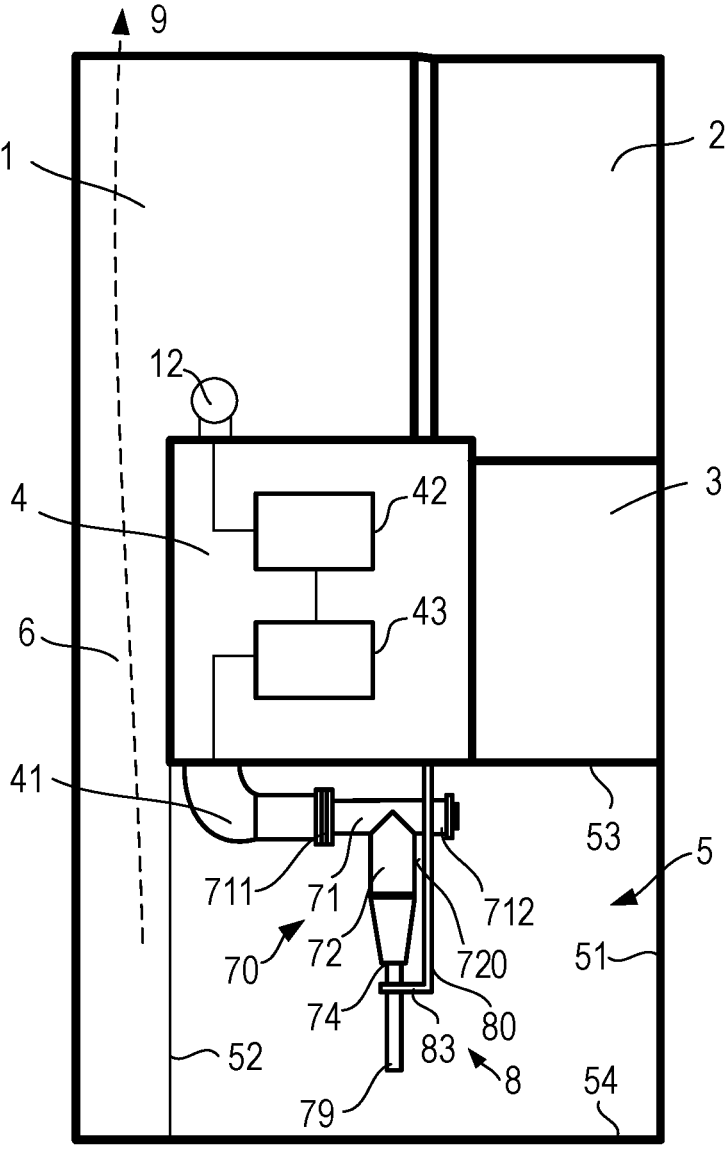
FIG. 1 schematically illustrates a switchgear according to an embodiment of the present disclosure.

FIG. 1 schematically illustrates a switchgear according to an embodiment of the present disclosure. As shown in FIG. 1, the switchgear comprises a cable compartment 5. In some embodiments, the switchgear further comprises one or more of: a bus compartment 1, a circuit breaker compartment 4, a drive cabinet compartment 3 and a low-voltage compartment 2. The drive cabinet compartment 3 is adapted to control the operation of the switchgear and the low-voltage compartment 2 receives suitable electrical device working at low-voltage.

For example, the bus compartment 1 may be located above the cable compartment 5. The circuit breaker compartment 4 is generally positioned between the bus compartment 1 and the cable compartment 5.

In some embodiments, a venting channel 6 may be arranged at a rear side of the switchgear. The venting channel 6 is used to vent gases out of the switchgear upon occurrence of the arc fault in the cable compartment 5 or in the bus compartment 1. The gas flow is indicated by the arrow 9 in FIG. 1.

As shown in FIG. 1, the cable compartment 5 is enclosed by a roof wall 53, a bottom wall 54, a rear wall 52 and a cover 51. In some embodiments, the cover 51 has a thickness in the range of 0 to 3 mm. For example, the cover 51 may be made of a single-layer metal plate. Since the cover 51 is thin, it can reduce the cost of the switchgear. The rear wall 52 is configured to be destroyed easily by the energy of the arc, thereby allowing gases to flow into the venting channel 6 if the arc occurs.

A cable bushing 41 is arranged in the cable compartment 5. The cable bushing 41 is adapted to electrically connect a cable 79 in the cable compartment 5 to a bus bar 12 in the bus compartment 1. For example, a circuit breaker 43 and a three-position isolator 42 are located in the circuit breaker compartment 4, and the circuit breaker 43 and the three-position isolator 42 are connected between the cable bushing 41 and the bus bar 12.

To electrically connect the cable bushing 41 to the cable 79, a cable connector 70 is arranged in the cable compartment 5. In the context of the present disclosure, the cable connector 70 refers to a cable adapter for connecting the cable bushing 41 to the cable 79.

The cable connector 70 comprises a first portion 72 to which the cable 79 is connected. In some embodiments, the first portion 72 further comprises a protrusion (not shown) for connecting an outer layer of the cable connector 70 to ground. As shown in FIG. 1, the cable 79 may be connected to the first portion 72 at an end 74 of the first portion 72.

The first portion 72 has an outer surface 720. As an example, a part of the first portion 72 may be of a cylindrical shape and a part of the first portion 72 may be of a tapered shape. It is to be understood that the shape of the first portion 72 can be of any suitable shape. The present disclosure does not intend to limit the shape of the first portion 72.

Alternatively or in addition, the cable connector 70 may further comprise a second portion 71 extending perpendicular to the first portion 72. Thus, the cable connector 70 is a T-shaped connector. The second portion 71 has a first end 711 connected to the cable bushing 41 and a second end 712 opposite to the first end 711.

A metal plate 8 is arranged inside the cable compartment 5 and comprises a main body 80 arranged around the first portion 72. Specifically, a shortest distance between the main body 80 and an outer surface 720 of the first portion 72 is in the range of 0 to 10 mm.

With the metal plate 8 arranged around the cable connector 70, when an arc occurs in the cable compartment 5, the metal plate 8 can be ionized by the arc to produce metal particles. The ionized metal particles will be incorporated into the plasma generated by the ionization of the gases and thus can increase the electrical conductivity of the plasma. As such, the electrical resistance of the plasma can be reduced. This helps to reduce the voltage drop across the plasma, thereby reducing the energy of the arc. In this way, it is possible to minimize the undesirable results caused by the arc.

Further, thanks to the ionization of the metal plate 8, a part of the energy of the arc is consumed and thus the temperature of the arc can be reduced. This is beneficial to reduce the pressure and the temperature inside the cable compartment 5. As the connecting position between the first portion 72 of the cable connector 70 and the cable 79 is more likely to have bad insulation over time, the main body 80 of the metal plate 8 arranged adjacent to the first portion 72 will be ionized by the arc immediately if the arc occurs. In this way, the energy of the arc can be reduced immediately when the arc occurs.

As discussed above, a part of the first portion 72 may be cylindrical and another part of the first portion 72 may be tapered. Accordingly, the main body 80 may extend to comply with the contour of the first portion 72. Specifically, a part of the main body 80 corresponding to the cylindrical part of the first portion 72 may extend in a straight manner, while another part of the main body 80 corresponding to the tapered part of the first portion 72 may extend obliquely.

In some embodiments, the metal plate 8 extends vertically and is positioned between the first portion 72 and the cover 51, as shown in FIG. 1. With these embodiments, the gases and the energy of the arc can be guided to the venting channel 6 arranged at the rear side of the switchgear to reduce the damage on the door. This can protect the persons around the switchgear.

In some embodiments, the main body 80 extends vertically beyond the end 74 of the first portion 72. As the end 74 is more likely to have bad insulation over time, the main body 80 is capable of reducing the energy of the arc.

In some embodiments, at least a part of the main body 80 contacts the outer surface of the first portion 72. As the main body 80 contacts the outer surface 720 of the first portion 72, the metal plate 8 can be ionized immediately to increase the electrical conductivity of the plasma if the arc occurs. Alternatively, or in addition, the main body 80 helps to connect an outer surface of the cable connector 70 to ground so as to improve the stability of the ground-connection of the cable connector 70.

In some embodiments, the metal plate 8 may comprise a bending portion 83 that extends from the main body 80 towards the cable 79. Further, a shortest distance between the bending portion 83 and the end 74 of the first portion 72 is in the range of 0 to 10 mm.

With the bending portion 83, the energy of the arc and the gases can be guided to the venting channel 6 arranged at the rear side of the switchgear, rather than moving towards the cover 51 or towards the bottom wall 54. This helps to release the energy or gases through the venting channel 6, and thus the damage to the cover 51 can be reduced. Further, the bending portion 83 can be ionized immediately when the arc occurs near the end 74, such that the electrical conductivity of the plasma can be increased, thereby reducing the energy of the arc.

In some embodiments, as shown in FIG. 1, a shortest distance between the main body 80 and the end 74 of the first portion 72 is in the range of 0 to 10 mm. This can further reduce the energy of the arc if the arc occurs.

Figure 2:
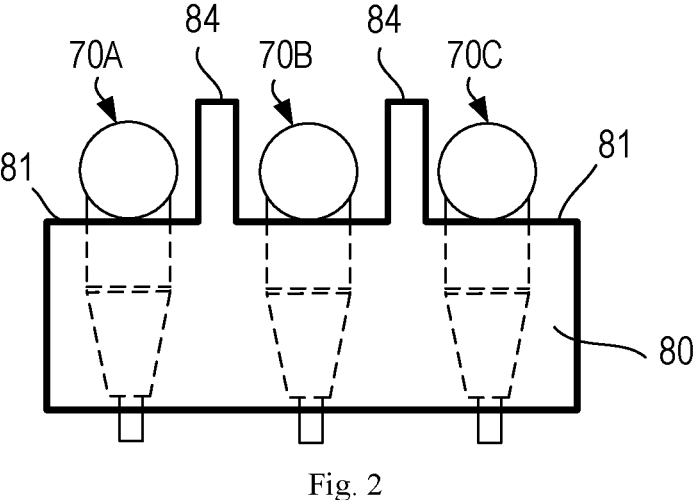
FIG. 2 schematically illustrates an exemplary arrangement of the metal plate relative to the cable connectors according to an embodiment of the present disclosure.

FIG. 2 schematically illustrates an exemplary arrangement of the metal plate relative to the cable connectors according to an embodiment of the present disclosure. In these embodiments, three cable connectors 70A, 70B, 70C are respectively connected to a respective cable of three-phase cables. The metal plates 8 for the three-phase cables are formed as an integrated plate. This can reduce the cost of the metal plate 8, while maintaining technical effects of the metal plate 8 as discussed above.

In some embodiments, as shown in FIGS. 1-2, a first end 84 of the main body 80 may be fixed to the roof wall 53. This simplifies the assembling of the metal plate 8. Further, since the roof wall 53 is connect to ground, the main body 80 helps to connect the outer surface of the cable connector 70 to ground.

In some embodiments, as shown in FIGS. 1-2, the metal plate 8 further comprises a support portion 81 for supporting the second portion 71 at a position near the second end 712. The cable bushing 41 is connected to the circuit breaker compartment 4 hermetically, and the cable connector 70 and the cable bushing 41 connected with each other actually constitute a structure of cantilever beam. By supporting one end of the cable connector 70 via the metal plate 8, the weight of the cable connector 70 and the cable bushing 41 can be partially carried by the metal plate 8, thus it is possible to prevent a leakage at a connecting position between the cable bushing 41 and the circuit breaker compartment 4.

Compared to the case that the cable connector is not supported, due to the fact that one end of the cable connector 70 is supported by the metal plate 8, insulation defects are unlikely to happen at the connecting position between the cable connector 70 and the cable bushing 41 or the connecting position between the cable connector 70 and the cable 79. This is beneficial to improve the reliability of the switchgear. Further, the support portion 81 supporting the second portion 71 helps to connect the outer surface of the cable connector 70 to ground.

In some embodiments, the metal plate 8 further comprises an opening 82 for receiving the protrusion of the first portion 72.

Figure 3:
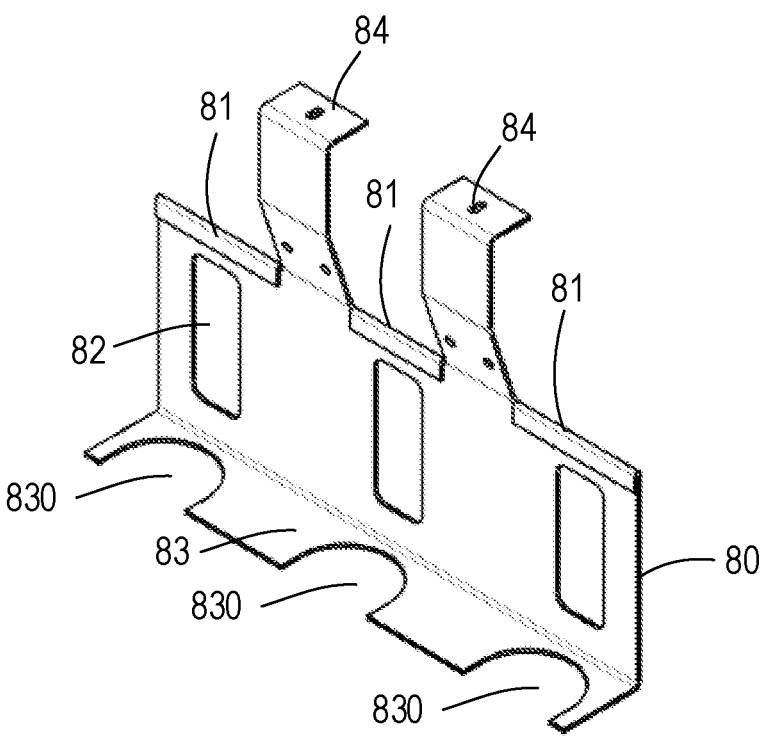
FIG. 3 schematically illustrates a perspective view of the metal plate according to an embodiment of the present disclosure.

FIG. 3 schematically illustrates a perspective view of the metal plate 8 according to an embodiment of the present disclosure. As shown in FIG. 3, the bending portion 83 may comprise a notch 830 for accommodating the cable 79.

FIG. 4 schematically illustrates a further exemplary arrangement of the metal plate 8 relative to the cable connectors 70 according to an embodiment of the present disclosure. In these embodiments, two or more cable connectors 70 are connected to one cable bushing 41 in series. Two or more metal plates 8 are arranged and the main body 80 of each metal plate 8 is arranged around the corresponding first portion 72 of the two or more cable connectors 70.

Taking two cable connectors 70-1 and 70-2 as an example, the second portions of the cable connectors 70-1 and 70-2 are connected in series, and each of the first portions of the cable connectors 70-1 and 70-2 is connected to a respective cable 79-1, 79-2.

In these embodiments, the metal plate 8 may comprise two or more metal plates and each metal plate is arranged around the corresponding first portion of the cable connectors 70-1, 70-2. For example, the metal plates 8-5 and 8-6 may be arranged around the cable connectors 70-1 and 70-2, respectively. In this way, the metal plate 8-5 or 8-6 can be ionized immediately when the arc occurs, thereby reducing the energy of the arc, such that the electrical conductivity of the plasma can be increased. The reliability and the safety level of the switchgear are improved accordingly.

It should be understood that, in some embodiments, it is possible to arrange the metal plate 8-6 around the cable connector 70-2 only to achieve the technique effects as discussed above. In this way, no metal plate is arranged around the cable connector 70-1. The only difference between this embodiment and the embodiments as shown in FIG. 4 is that there is no metal plate to reduce the energy of the arc occurring at the first portion of the cable connector 70-1.

It is to be understood that the present disclosure does not intend to limit the number of the metal plates. For example, more than one metal plate may be arranged between adjacent first portions of the cable connectors 70-1 and 70-2. As an exemplary embodiment, two metal plates may be arranged between adjacent first portions, i.e., one is closer to the cable connector 70-1 and the other one is closer to the cable connector 70-2.

It is to be understood that the structure of the metal plate 8-5 or 8-6 may be the same as the metal plate 8 as discussed above with reference to any one of FIGS. 1-3. The detailed explanation of the metal plate 8-5 or 8-6 thus is omitted.

FIG. 5 schematically illustrates the bus compartment of the switchgear according to an embodiment of the present disclosure. In these embodiments, the bus compartment 1 comprises the bus bar 12 and a busbar bushing 10. The busbar bushing 10 is used to connect the bus bar 12 to the circuit breaker 43 and the three-position isolator 42. A bus connector 11 is located in the bus compartment 1 to connect the busbar bushing 10 to the bus bar 12. In the context of the present disclosure, the bus connector 11 refers to a bus adapter for connecting the busbar bushing 10 to the bus bar 12.

In some embodiments, the bus connector 11 may be a T-shaped connector or a cross-shaped connector.

As shown in FIG. 5, a further metal plate 100 is arranged inside the bus compartment 1 and positioned above the bus connector 11. The function of the further metal plate 100 is the same as the metal plate 8. When an arc occurs in the bus compartment 1, the further metal plate 110 can be ionized immediately to increase the electrical conductivity of the plasma, thereby reducing the energy of the arc. In this way, it is possible to minimize the undesirable results caused by the arc.

With these embodiments, the gases and the energy of the arc can be guided to the venting channel 6 arranged at the rear of the switchgear, rather than moving towards a top cover of the bus compartment 1. Therefore, it is possible to reduce damage to the top cover of the bus compartment 1.

In some embodiments, the bus bar 12 is connected to the bus connector 11 at an end of the bus connector 11. A shortest distance between the further metal plate 100 and an outer surface of the end of the bus connector 11 is in the range of 0 to 10 mm. As the bus connector 11 is more likely to have bad insulation over time, the further metal plate 100 arranged around the bus connector 11 can be ionized immediately when the arc occurs, such that the electrical conductivity of the plasma can be increased, thereby reducing the energy of the arc.

Further, thanks to the ionization of the further metal plate 100, a part of the energy of the arc is consumed and thus the temperature of the arc can be reduced. This is beneficial to reduce the pressure and the temperature inside the bus compartment.

In addition, due to the further metal plate 100, the gases and the energy of the arc can be guided to the venting channel arranged at the rear of the switchgear. This can protect the persons around the switchgear.

In some embodiments, the further metal plate 100 is configured to support a potential transformer. A hole 110 is provided in the further metal plate 100, and the potential transformer may be connected to the bus connector 11 through the hole 110. In this way, the switchgear has a simple structure.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:
1. A switchgear comprising:
a cable compartment enclosed by walls and a cover;

9 a cable connector arranged in the cable compartment and configured to electrically connect a cable to a cable bushing located in the cable compartment, wherein the cable connector comprises:

a first portion to which the cable is connected; and a second portion extending perpendicular to the first portion and having a first end connected to the cable bushing and a second end opposite to the first end; and a metal plate arranged inside the cable compartment and comprising a main body arranged adjacent the first portion, wherein the metal plate further comprises a support portion supporting the second portion at a position adjacent the second end;

wherein a shortest distance between the main body and an outer surface of the first portion is in a range of 0 to 10 mm.

2. The switchgear of claim 1, wherein the shortest distance between the main body and the outer surface of the first portion is 0 mm.

3. The switchgear of claim 1, wherein the metal plate further comprises a bending portion extending from the main body towards the cable;

wherein the first portion comprises an end for connecting the cable; and wherein a shortest distance between the bending portion and the end of the first portion is in the range of 0 to 10 mm.

4. The switchgear of claim 3, wherein the bending portion comprises a notch accommodating the cable.

5. The switchgear of claim 1, wherein the main body extends vertically and is positioned between the first portion and the cover.

6. The switchgear of claim 1, wherein two or more cable connectors are connected to the cable bushing in series; and wherein two or more metal plates are arranged and the main body of each metal plate is arranged adjacent a corresponding first portion.

7. The switchgear of claim 1, wherein a first end of the main body is fixed to a roof wall of the walls.

8. The switchgear of claim 1, wherein three cable connectors are respectively connected to a respective cable of three-phase cables; and wherein the metal plates for the three-phase cables are formed as an integrated plate.

9. The switchgear of claim 1, further comprising a bus compartment located above the cable compartment, the bus compartment comprising:

a bus bar and a busbar bushing;

a bus connector connecting the bus bar to the busbar bushing;

a further metal plate arranged inside the bus compartment and positioned around the bus connector;

wherein a shortest distance between the further metal plate and the bus connector is in the range of 0 to 10 mm.

10. The switchgear of claim 9, wherein the further metal plate is comprises a hole.

11. The switchgear of claim 9, further comprising:

a circuit breaker compartment located between the bus compartment and the cable compartment; and a venting channel for venting gases out of the switchgear upon occurrence of an arc fault in the cable compartment or the bus compartment.

12. The switchgear of claim 1, wherein the thickness of the cover is up to 3 mm.

13. The switchgear of claim 12, wherein the cover is made of a single-layer metal plate.

14. The switchgear of claim 1, wherein the metal plate further comprises an opening for receiving the first portion.

15. A switchgear comprising:

a cable compartment enclosed by walls and a cover;

a cable connector arranged in the cable compartment and configured to electrically connect a cable to a cable bushing located in the cable compartment, wherein the cable connector comprises a first portion to which the cable is connected;

a metal plate arranged inside the cable compartment and comprising a main body arranged adjacent the first portion; and a bus compartment located above the cable compartment, the bus compartment comprising:

a bus bar and a busbar bushing;

a bus connector connecting the bus bar to the busbar bushing; and a further metal plate arranged inside the bus compartment and positioned around the bus connector, wherein a shortest distance between the further metal plate and the bus connector is in a range of 0 to 10 mm.

* * * * *